United States Patent
Condello et al.

(10) Patent No.: US 10,335,995 B2
(45) Date of Patent: Jul. 2, 2019

(54) SYSTEM AND METHOD FOR COMPENSATING FOR DISSIMILAR SHRINKAGE RATES IN DIFFERENT MATERIALS USED TO FORM A THREE-DIMENSIONAL PRINTED OBJECT DURING ADDITIVE MANUFACTURING

(71) Applicant: Xerox Corporation, Norwalk, CT (US)

(72) Inventors: Anthony S. Condello, Webster, NY (US); Jeffrey J. Folkins, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 332 days.

(21) Appl. No.: 14/970,757

(22) Filed: Dec. 16, 2015

(65) Prior Publication Data
US 2017/0173870 A1    Jun. 22, 2017

(51) Int. Cl.
| B29C 64/112 | (2017.01) |
| B29C 64/135 | (2017.01) |
| B29C 64/20 | (2017.01) |
| B33Y 10/00 | (2015.01) |
| B33Y 30/00 | (2015.01) |

(52) U.S. Cl.
CPC .......... B29C 64/112 (2017.08); B29C 64/135 (2017.08); B29C 64/20 (2017.08); B33Y 10/00 (2014.12); B33Y 30/00 (2014.12)

(58) Field of Classification Search
CPC ..... B29C 64/112; B29C 64/135; B29C 64/20; B29C 67/00; B29C 64/40; B33Y 10/00; B33Y 30/00; G06T 17/00
USPC .......................................... 425/375; 264/401
See application file for complete search history.

(56) References Cited

U.S. PATENT DOCUMENTS

| 5,260,009 A | 11/1993 | Penn |
| 6,695,423 B2 | 2/2004 | Hattori |
| 6,974,198 B2 | 12/2005 | Usuda |
| 7,101,440 B2 | 9/2006 | Nakamura et al. |
| 7,198,821 B2 | 4/2007 | Furusawa et al. |
| 7,300,619 B2 * | 11/2007 | Napadensky ........... B29C 64/40 264/401 |
| 7,413,765 B2 | 8/2008 | Ito et al. |
| 7,461,912 B2 | 12/2008 | Kamiyama et al. |
| 7,582,333 B2 | 9/2009 | Hirai et al. |
| 7,748,825 B2 | 7/2010 | Hiruma et al. |
| 8,187,670 B2 | 5/2012 | Toyoda |
| 8,435,093 B2 | 5/2013 | Takeuchi |
| 8,778,712 B2 | 7/2014 | Takeuchi |

(Continued)

FOREIGN PATENT DOCUMENTS

EP            1 695 399 A1      8/2006

OTHER PUBLICATIONS

Definition of Pneumatics—Wikipedia_posted on Mar. 21, 2015 (Year: 2015).*

*Primary Examiner* — Matthew J Daniels
*Assistant Examiner* — Yunju Kim
(74) *Attorney, Agent, or Firm* — Maginot Moore & Beck LLP (57) ABSTRACT

A method of manufacturing a three-dimensional object compensates for different rates of shrinkage during curing of dissimilar materials. The compensation is achieved by ejecting the different materials with reference to the shrinkage rates of the materials to enable the materials to be at approximately a same height following curing of the materials.

6 Claims, 8 Drawing Sheets

(56) References Cited

U.S. PATENT DOCUMENTS

| | | |
|---|---|---|
| 8,784,723 B2 | 7/2014 | Napadensky |
| 8,932,666 B2 | 1/2015 | Tahira et al. |
| 8,995,022 B1 | 3/2015 | Vronsky et al. |
| 9,010,899 B2 | 4/2015 | Harjee et al. |
| 2003/0186613 A1 | 10/2003 | Kawase |
| 2011/0198661 A1 | 8/2011 | Dowling et al. |
| 2013/0073068 A1* | 3/2013 | Napadensky ....... B29C 67/0059 700/98 |
| 2013/0341611 A1 | 12/2013 | Moon |
| 2015/0314531 A1* | 11/2015 | Mark ..................... B33Y 70/00 264/241 |
| 2017/0239890 A1* | 8/2017 | Folkins ................. B33Y 10/00 |

\* cited by examiner

SYSTEM AND METHOD FOR COMPENSATING FOR DISSIMILAR SHRINKAGE RATES IN DIFFERENT MATERIALS USED TO FORM A THREE-DIMENSIONAL PRINTED OBJECT DURING ADDITIVE MANUFACTURING

TECHNICAL FIELD

The system and method disclosed in this document relate to the manufacture of three-dimensional printed objects and, more particularly, to leveling layers in the objects as the layers are cured during manufacture of the objects.

BACKGROUND

Digital three-dimensional object manufacturing, also known as digital additive manufacturing, is a process of making a three-dimensional solid object of virtually any shape from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

Additive manufacturing of three-dimensional printed electronic devices typically includes the formation of electrically conductive paths that are encased within electrically insulating structure. An example of a material useful for forming electrically conductive paths in an additive manufacturing process is an aqueous or solvent-based metallic colloidal solution and an example of a material useful for forming electrically insulating structure is an ultraviolet (UV) curable polymer. One challenge associated with building these devices by ejecting these materials is managing the changes that occur in the materials during drying, curing, and sintering of the materials.

Figure 4:
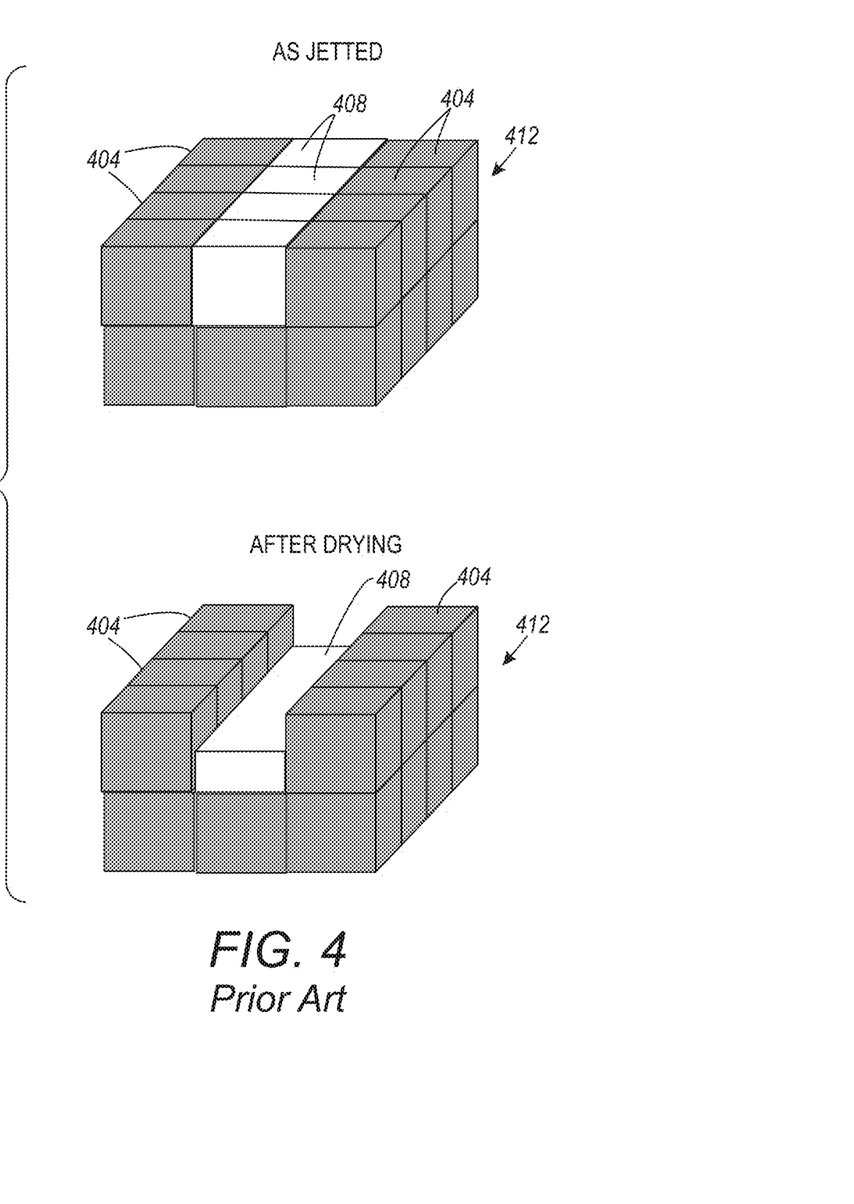
FIG. 4 is an illustration of the prior art printing and curing that shows the volumetric reduction that occurs in two different materials forming a layer of a three-dimensional object after the layer is cured.

One change that occurs when the metal solution is dried is shown in FIG. 4. The layer 412 is formed with drops 404 of a UV polymer and drops 408 of a metallic colloidal solution. As shown in the upper illustration in FIG. 4, all of the drops 404 and 408 have the same volume when ejected. During drying, curing, or sintering of the layer 412, the volume of the drops 408 of the metallic colloidal solution are significantly reduced as the water or solvent is volatized. The drops 404 of the UV curable polymer or other electrically insulating material, however, maintains approximately the same volume the drops had when they were ejected. The different volumes in the two materials occurring after the drying and curing of the materials produce voids or dips in the layer. Consequently, subsequent layers formed on this uneven layer can have deformities in their structure. An additive manufacturing process that enables level layers to be formed with materials having dissimilar shrinkage or reduction rates during drying, curing, or sintering would be beneficial.

SUMMARY

An additive manufacturing method that compensates for different shrinkage rates in materials forming three-dimensional printed objects includes ejecting drops of a first material to form a portion of a layer in an object with reference to a volumetric reduction of the first material during curing of the layer, and ejecting drops of a second material to form another portion of the layer in the object with reference to a volumetric reduction of the second material during curing of the layer, the volumetric reduction of the first material being greater than the volumetric reduction of the second material.

An additive manufacturing system that compensates for different shrinkage rates in materials forming three-dimensional printed objects includes a first ejector head having a plurality of ejectors pneumatically connected to a source of a first material, a second ejector having a plurality of ejectors pneumatically connected to a source of a second material, and a controller operatively connected to the first ejector head and the second ejector head, the controller being configured to operate the first ejector head to eject drops of the first material to form a portion of a layer in an object with reference to a volumetric reduction of the first material during curing of the layer and to operate the second ejector head to eject drops of the second material to form another portion of the layer in the object with reference to a volumetric reduction of the second material during curing of the layer, the volumetric reduction of the first material being greater than the volumetric reduction of the second material.

BRIEF DESCRIPTION OF THE DRAWINGS

The foregoing aspects and other features of the method and printer are explained in the following description, taken in connection with the accompanying drawings.

DETAILED DESCRIPTION

For a general understanding of the system and the method disclosed herein as well as the details for the system and the method, reference is made to the drawings. In the drawings, like reference numerals designate like elements.

Figure 1:
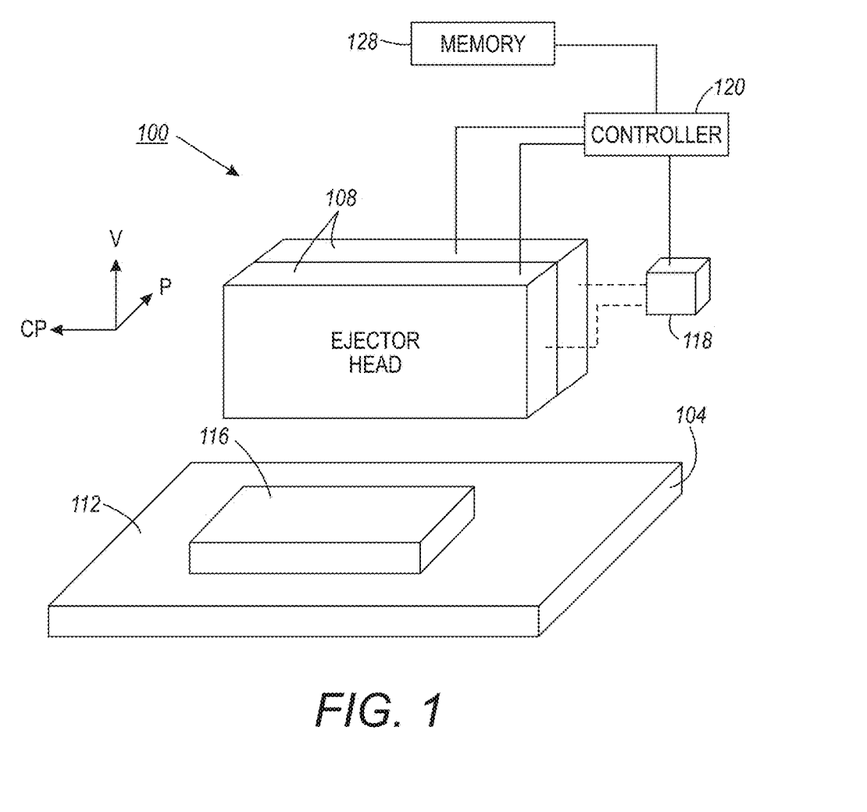
FIG. 1 shows an additive manufacturing system that can compensate for volumetric reduction differences between at least two materials used by the system to form three-dimensional objects.

FIG. 1 shows a three-dimensional object printer or additive manufacturing system 100 that ejects at least two different materials to form areas within layers of the object being formed. The printer 100 comprises a platen 104 and at least a pair of ejector heads 108. Each ejector head 108 has a plurality of ejectors configured to eject drops of material towards a surface 112 of the platen 104 to form areas within layers of a three-dimensional object, such as the part 116. Support areas within these layers can also be formed with other materials to enable part feature formation as known in the art. Each ejector head 108 is configured to move relative to the platen 104 in the process direction P, the cross-process direction CP, and the vertical direction V. In some embodiments, such as the one shown in FIG. 1, the printer 100 includes actuators 118 configured to move one or both of the ejector heads 108 and the platen 104 with respect to one another.

The printer 100 includes a controller 120 operatively connected to the at least two ejector heads 108 and the actuators 118. The controller 120 is configured to operate the ejector heads 108 with reference to object image data that has been rendered into layers that form a three-dimensional object on the platen 112. To form each layer of the three-dimensional object, the controller 124 operates the printer 100 to sweep the ejector heads 108 one or more times in the process direction P, while ejecting drops of material onto the platen 104. In the case of multiple passes, the ejector heads 108 shift in the cross-process direction CP between each sweep. After each layer is formed, the ejector heads 108 move away from the platen 104 in the vertical direction V to begin printing the next layer. As explained below, the controller 120 operates various components in the system 100 to compensate for volumetric reduction differences between different types of material ejected by the ejector heads 108. As used in this document, "volumetric reduction" refers to shrinkage in volume of a material that occurs during drying, curing, or sintering of the material. In order to implement these methods, some embodiments of the system 100 have a configuration for the ejector head 108 that ejects the material having the higher shrinkage rate that is different than the configuration for the ejector head 108 that ejects drops of the material having lesser shrinkage rate. For example, the ejector head 108 that ejects drops of the material having the higher shrinkage rate can be operated to eject drops with variable volumes, operated at a frequency that is greater than the frequency at which the ejector head 108 ejects the drops having the lesser shrinkage rate, or can be configured with a number of ejectors per linear unit of distance that is greater than the number of ejectors per linear unit of distance in the ejector head 108 that ejects the lower shrinkage material.

The controller 120 is operatively connected to a memory 128 in which reduction or shrinkage rates for materials are stored. As used in this document, "reduction rate" or "shrinkage rate" means data that identifies an amount of reduction that occurs in a specified volume of ejected material during drying, curing, or sintering of the material. Controller 120 of FIG. 1 uses these data to determine the difference between the drops in a layer caused by curing of the layer. These differences are used by the controller 120 to modify the rendered layer data to form a layer of an object in a manner that compensates for an identified reduction of the ejected materials after drying, curing, or sintering. To facilitate the continuing discussion in this document, the term "curing" refers to any operation on an ejected material for the purpose of solidifying or otherwise altering the properties of the material as ejected. These operations include, but are not limited to, exposure to radiation, thermal processing, addition of chemicals, or the like.

Figure 2:
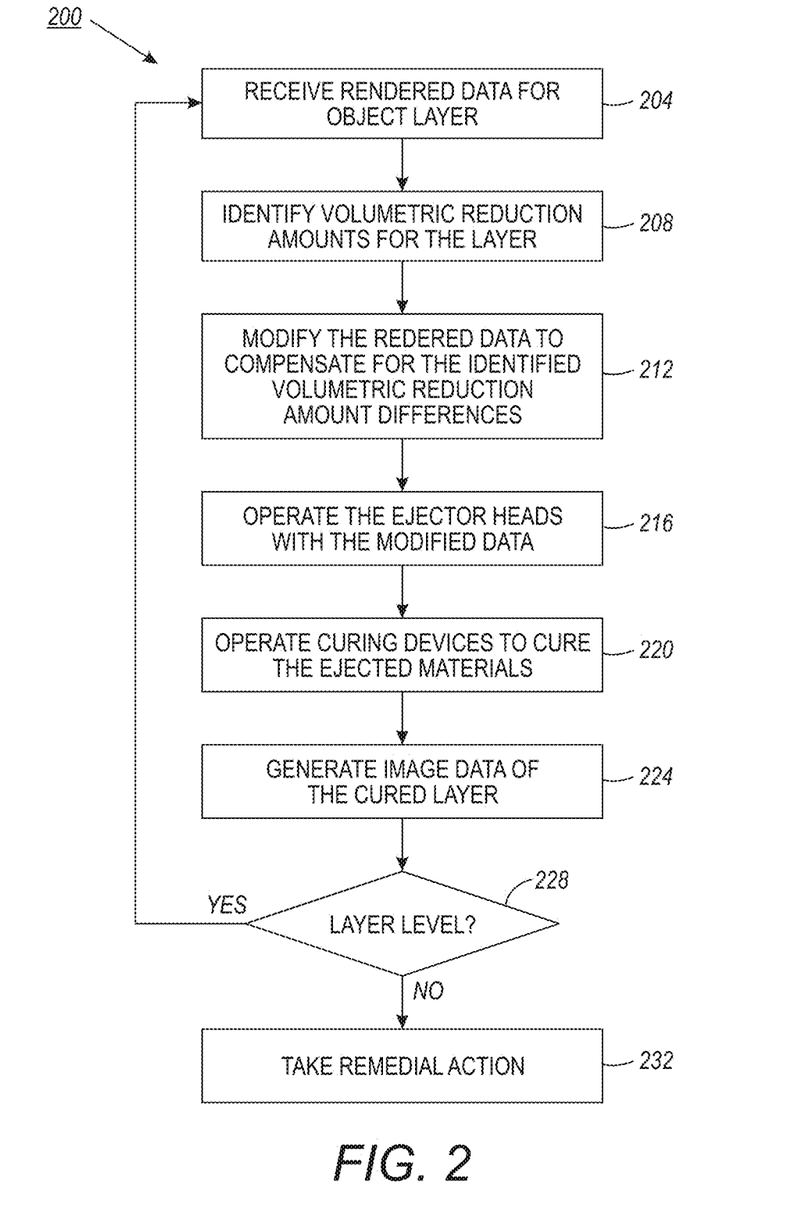
FIG. 2 depicts a process for operating an additive manufacturing system to compensate for volumetric reduction differences between at least two materials used by the system to form three-dimensional objects.

An overview of a process 200, shown in FIG. 2, is used to operate the system 100 to compensate for the different reduction rates of materials ejected by the ejector heads 108. Statements that the process is performing some task or function refers to a controller or general purpose processor executing programmed instructions stored in non-transitory computer readable storage media operatively connected to the controller or processor to manipulate data and operate one or more components in the system to perform the task or function. The controller 120 of the printer 100 noted above can be configured with components and programmed instructions to provide a controller or processor that performs the process 200. Alternatively, the controller can be implemented with more than one processor and associated circuitry and components, each of which is configured to form one or more tasks or functions described herein.

The method 200 begins by receiving rendered layer data for each material to be ejected from the ejector heads 108 (block 204). The process continues by identifying an amount of volumetric reduction in the materials ejected to form the layer using the rendered layer data (block 208). The process then modifies the rendered layer data to compensate for differences between the shrinkage of different materials in the layer caused by curing the layer (block 212). The modified rendered layer data is used to operate the ejector heads 108 (block 216). One or more curing devices are used to cure the materials (block 220). An optical device, such as a profilometer, can be used to generate image data of the cured layer to enable the process to verify the layer is adequately level for continued production of the part (block 224). If the layer is appropriately formed (block 228), then the process continues with the formation of the next layer (block 204). Otherwise, remedial action is taken (block 232).

The modification of the rendered layer data can occur in any one of five ways, or combinations of these ways, which are discussed below. The five methods are the use of larger drop volumes for a material, an increased frequency of drops ejected for a material, an increase in a number of passes made with an ejector head to apply more material to predetermined areas of a layer, dithering the rendered layer to promote spreading of a material within a layer, and generating data to cover a material with a higher shrinkage rate. Each of these techniques are now discussed with reference to the FIGS. 3A, 3B, 3C, 3D, and 3E.

Figure 3A:
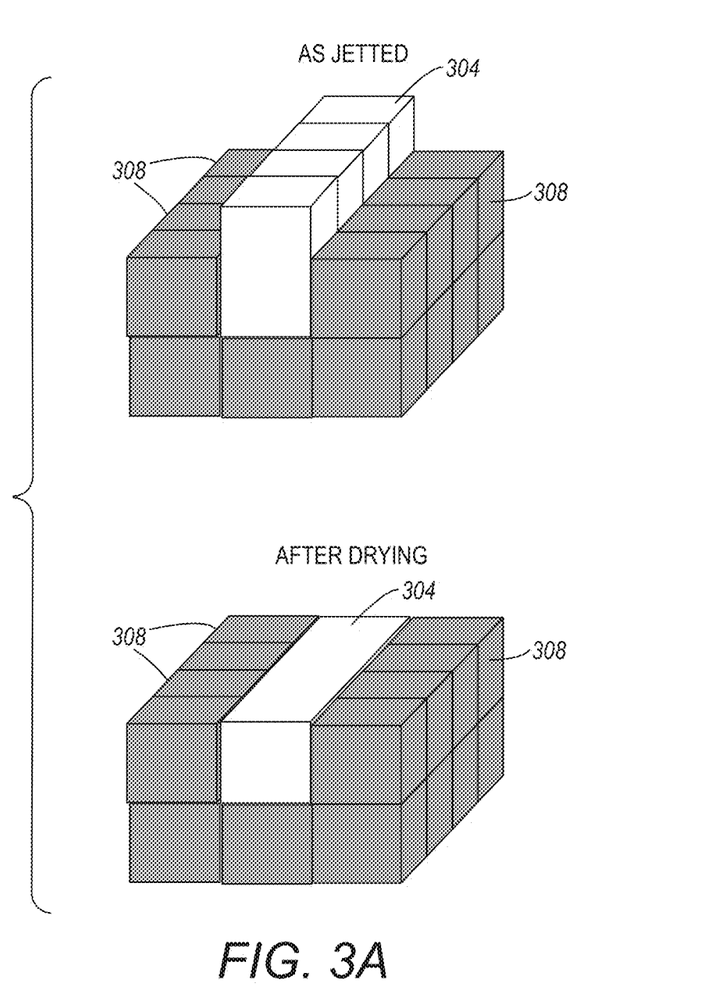
FIG. 3A illustrates a first technique for compensating for volumetric reduction differences between at least two materials used to form three-dimensional objects by increasing the volume of the drops of the material having the higher shrinkage rate.

As shown in FIG. 3A, the rendered layer data for a material having a higher reduction rate is modified to eject the drops 304 for the material having the greater shrinkage rate with a volume that is greater than a volume of the drops 308 ejected for the material having a lesser shrinkage rate. The volumetric differences in the drops compensate for the differences in volumetric reduction of the materials that occur during curing of the layer as shown in the lower illustration of FIG. 3A.

In some additive manufacturing systems, the ejectors in the ejector heads 108 cannot eject material drops of different sizes as shown in FIG. 3A. In these systems, the ejectors ejecting the drops 310 of the material having the greater shrinkage rate are ejected with a resolution that is greater than a resolution of the drops 314 of the material having the lesser shrinkage rate. As a consequence, more drops 310 are ejected into the space for the higher shrinking material that the number of drops 314 ejected into the space for lower shrinking material. The greater number of drops provides a larger volume for the higher shrinkage rate material to compensate for the greater volumetric reduction of the material during curing of the layer as shown in the lower illustration of FIG. 3B.

Figure 3B:
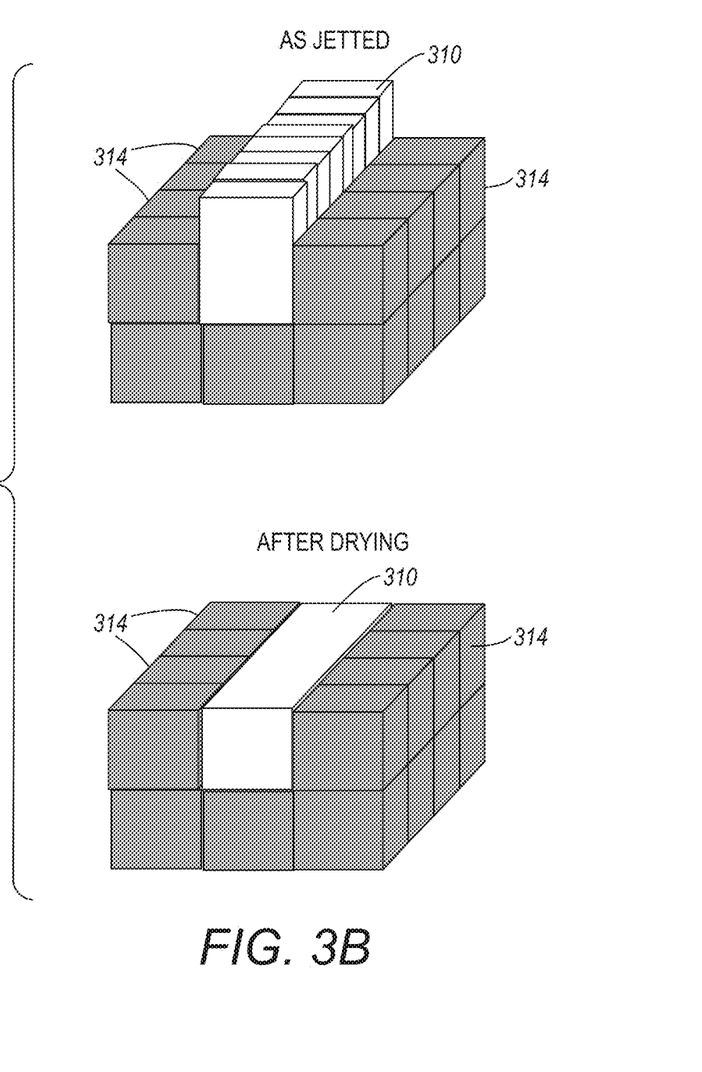
FIG. 3B illustrates a second technique for compensating for volumetric reduction differences between at least two materials used to form three-dimensional objects by increasing the resolution of the drops of the material having the higher shrinkage rate.
Figure 3C:
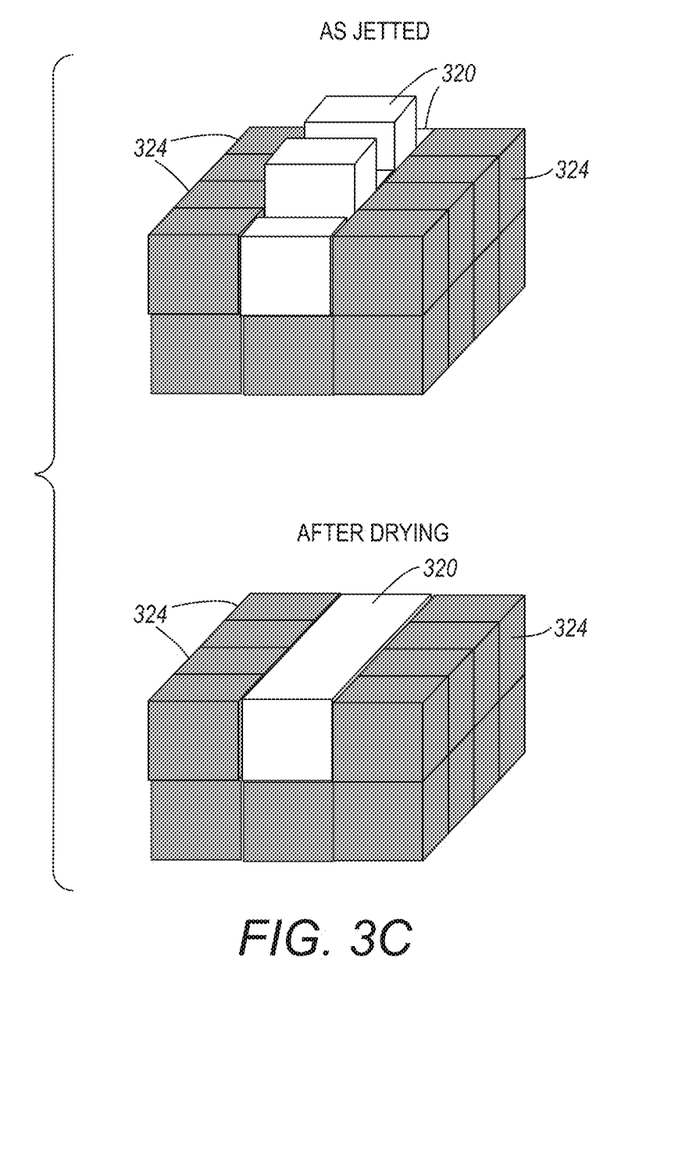
FIG. 3C illustrates a third technique for compensating for volumetric reduction differences between at least two materials used to form three-dimensional objects by increasing the number of passes for the ejector head ejecting the drops of the material having the higher shrinkage rate.

The greater resolution can be achieved with one of three methods or a combination of the methods. One method for obtaining a greater resolution is to operate the ejectors in the ejector head 108 that ejects the higher shrinking material at a higher frequency than the ejectors in the ejector head 108 that ejects the lower shrinking material. In another method for obtaining a greater resolution, the controller 120 operates the actuators 118 to move the ejector head 108 that ejects the higher shrinking material at a slower speed than the speed at which the controller 120 operates the actuators 118 to move the ejector head 108 that ejects the lower shrinking material. This method of operation enables the ejector head 108 ejecting the higher shrinking material to eject more drops of the material into the space for the higher shrinking material in the layer. In another method for obtaining a greater resolution, the ejector head 108 that ejects the higher shrinking material is configured to have more ejectors per linear unit of distance than the number of ejectors per linear unit distance in the ejector head 108 that ejects the lower shrinking material. For example, the ejector head that ejects the higher shrinking material has a number of ejectors that can eject 600 drops per inch, while the ejector head that ejects the lower shrinking material has a number of ejectors that can eject 300 drops per inch. By modifying the rendered data to enable more of the ejectors ejecting the higher shrinking material per inch to be operated more drops of the higher shrinking material is ejected into the space for the higher shrinking material in the layer than can be ejected into the space for the lower shrinking material.

In some additive manufacturing systems, the ejector head 108 cannot eject material drops with greater resolution as discussed with regard to FIG. 3B. In these systems, the controller 120 operates the actuators 118 to move the ejector head ejecting the drops 320 of the material having the greater shrinkage rate a number of passes over the space for that material that is greater than the number of passes that the controller 120 operates the actuators 118 to move the ejector head ejecting the drops 324 of the material having the lesser shrinkage rate. By passing the ejector head ejecting the drops 320 over the area more often than the ejector head ejecting the drops 324 more drops of the material having the higher shrinkage rate can be ejected into layer to compensate for the greater volumetric reduction of that material during curing of the layer as shown in the lower illustration of FIG. 3C. This technique enables the same types of ejector heads to be used for both materials.

Figure 3D:
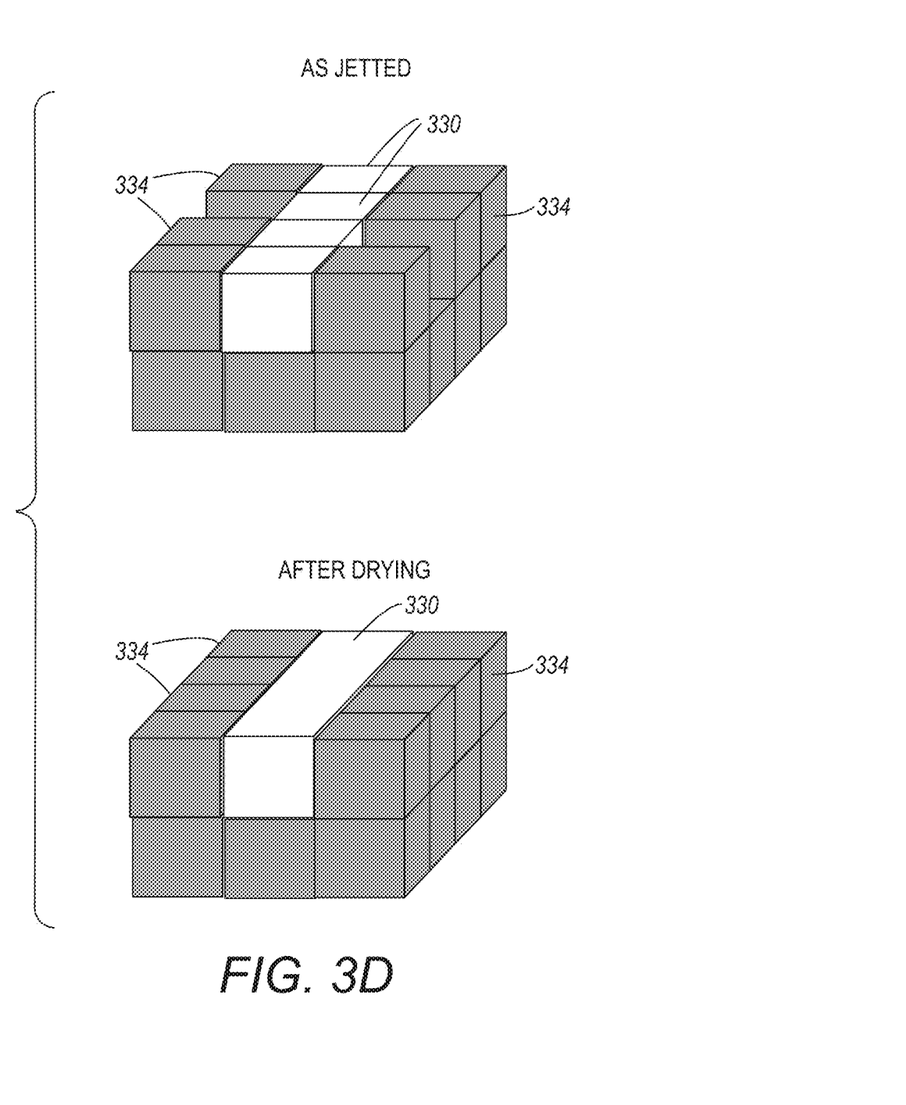
FIG. 3D illustrates a fourth technique for compensating for volumetric reduction differences between at least two materials used to form three-dimensional objects by dithering data used to operate the ejector head ejecting the drops of the material having the lesser shrinkage rate.

In some additive manufacturing systems, the rendered layer data for the material having the lower shrinkage rate is dithered to compensate for the shrinkage rate differences. As shown in FIG. 3D, the drops 334 of the material having the lower shrinkage rate are ejected with a pattern having voids at predetermined locations that enable this material to spread under the effect of surface tension and laminar flow. As the drops 334 of the material having the lesser shrinkage rate spread into the area in which no material drops having been ejected, the height of this material approaches that of the drops 330 of the material having the higher shrinkage rate after curing.

Figure 3E:
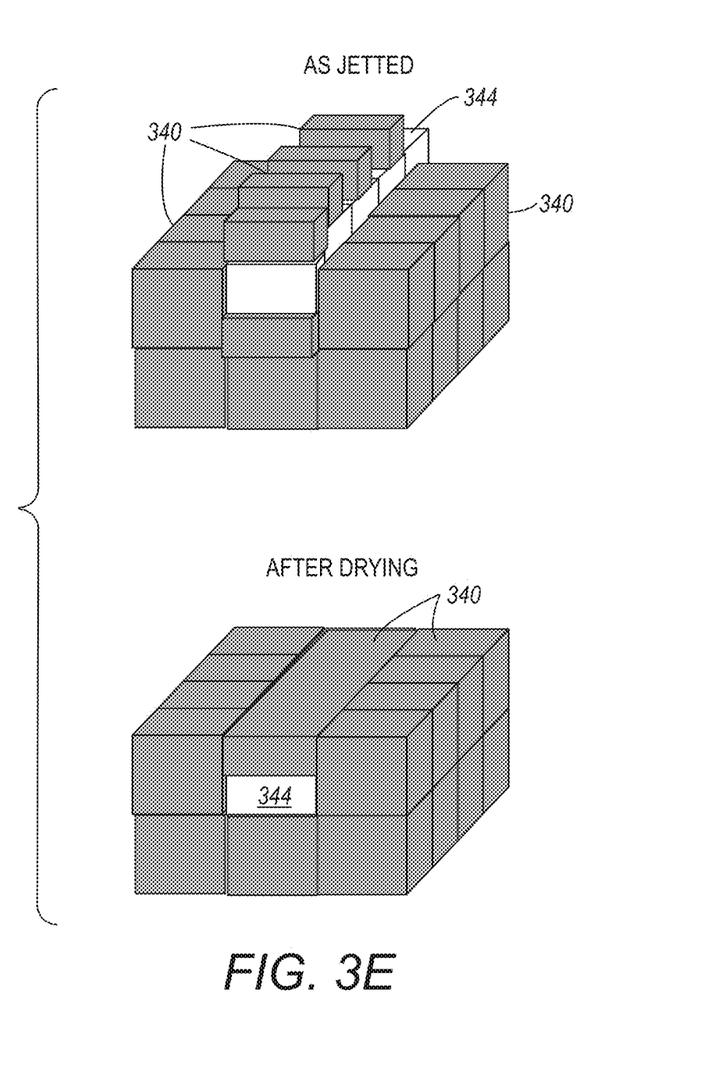
FIG. 3E illustrates a fifth technique for compensating for volumetric reduction differences between at least two materials used to form three-dimensional objects by covering the drops of the material having the higher shrinkage rate with drops of the material having the lesser shrinkage rate.

The fifth technique that can be used to compensate for materials of significantly different shrinkage rates is shown in FIG. 3E. In this technique, drops 340 of the material having the lesser shrinkage rate are ejected on the drops 344 of the material having the greater shrinkage rate. Thus, as the drops 344 of the material having the greater shrinkage rate fall below the height of the drops 340 during curing, the drops 340 of the lesser shrinkage rate that cover the drops 344 fill in the voids as shown in FIG. 3E.

While each of the five techniques can be used alone as described above to compensate for the different volumetric reductions in the material drops of a layer, they can also be used selectively or in combination with one or more of the other techniques. That is, the controller 120 can used different techniques for different layers. For example, if the number of pixel data for the drops of the material having the lesser shrinkage rate is so great that a number of voids required for adequate spreading of the lesser shrinkage rate material cannot be introduced by dithering, one of the other techniques can be used, alone or in combination with other of the techniques.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed:

1. An additive manufacturing system comprising:
 a first ejector head having a plurality of ejectors pneumatically connected to a source of a first material;
 a second ejector head having a plurality of ejectors pneumatically connected to a source of a second material; and
 a controller operatively connected to the first ejector head and the second ejector head, the controller is configured to:
 modify object image data that has been rendered into layers, the modification of the object image data is for the object image data corresponding to the second material only in one layer in an object being made with reference to a difference between a volumetric reduction of the first material and a volumetric reduction of the second material so data values corresponding to the second material are distributed in a pattern having voids at predetermined locations that enable drops of the second material to spread into the voids so a height of the second material in the one layer is equal to a height of the first material after the one layer is cured, dried, or sintered, the volumetric reduction of the first material being greater than the volumetric reduction of the second material; operate the ejectors in the first ejector head using unmodified object image data corresponding to the first material in the one layer to eject drops of the first material in the one layer according to a first pattern to form a portion of the one layer in the object; and operate the ejectors in the second ejector head using the modified object image data corresponding to the second material in the one layer to eject drops of the second material in the one layer according to the second pattern having the voids at the predetermined locations to form another portion of the layer in the object, the first pattern being different than the second pattern.

2. The system of claim 1, the controller is further configured to:

modify the object image data for another layer with reference to the difference in the volumetric reduction of the first material and the volumetric reduction of the second material so data values corresponding to the first material identify a first drop volume and data values corresponding to the second material identify a second drop volume that is different than the first drop volume to make the controller referencing the modified object data for the other layer corresponding to the second material operate the ejectors in the second ejector head to eject drops of the second material in the other layer with the second drop volume that is different than the first drop volume with which drops of the first material in the other layer are ejected.

3. The system of claim 1, the controller is further configured to:

modify the object image data for another layer with reference to the difference in the volumetric reduction of the first material and the volumetric reduction of the second material so data values corresponding to the first material identify a first resolution and data values corresponding to the second material identify a second resolution that is different than the first resolution to make the controller referencing the modified object image data for the other layer corresponding to the second material operate the ejectors in the second ejector head to eject drops of the second material in the other layer with the second resolution that is different than the first resolution with which drops of the first material in the other layer are ejected.

4. The system of claim 3, the controller is further configured to:

modify the object image data for another layer with reference to the difference in the volumetric reduction of the first material and the volumetric reduction of the second material so data values corresponding to the first material identify a first frequency and data values corresponding to the second material identify a second frequency to make the controller referencing the modified object image data for the other layer corresponding to the second material operate the ejectors in the second ejector head to eject drops of the second material in the other layer at the second frequency that is different than the first frequency at which drops of the first material in the other layer were ejected.

5. The system of claim 3, wherein the first ejector head has more ejectors per linear unit than the second ejector head.

6. The system of claim 1, the controller is further configured to:

modify the object image data for another layer with reference to the difference in the volumetric reduction of the first material and the volumetric reduction of the second material so data values corresponding to the second material in the other layer identify positions for drops of the second material in the other layer that overlap with positions of drops of the first material in the other layer so the controller referencing the modified object image data for the other layer corresponding to the second material operates the ejectors in the second ejector head to eject drops of the second material upon drops of the first material ejected by the ejectors in the first ejector head.

* * * * *